United States Patent [19]

Miller et al.

[11] Patent Number: 4,514,812

[45] Date of Patent: Apr. 30, 1985

[54] METHOD AND APPARATUS FOR CONTROLLING THE THICKNESS OF A LAMINA OF A COEXTRUDED LAMINATE

[75] Inventors: Peter S. Miller, Waterville; Maclin S. Hall, Perrysburg, both of Ohio

[73] Assignee: Owens-Illinois, Inc., Toledo, Ohio

[21] Appl. No.: 424,686

[22] Filed: Sep. 27, 1982

[51] Int. Cl.³ .................... G06F 15/46; G06G 7/64; B28B 17/00; B28 00/00

[52] U.S. Cl. .................... 364/473; 425/141; 425/140; 425/145; 425/148; 264/40.2; 264/40.1; 264/40.3; 264/40.7; 364/469; 364/468; 324/61 P

[58] Field of Search ............ 364/468, 469, 473; 264/40.1, 40.2, 40.3, 40.7; 425/140, 141, 145, 148; 324/61 P

[56] References Cited

U.S. PATENT DOCUMENTS

| | | | |
|---|---|---|---|
| 2,978,638 | 4/1961 | Wing et al. | 324/61 P |
| 3,826,903 | 7/1974 | Varasso | 364/473 |
| 3,914,357 | 10/1975 | Cereijo | 425/141 |
| 3,930,774 | 1/1976 | Brand et al. | 425/141 |
| 3,930,922 | 1/1976 | Donoghue et al. | 425/141 |
| 4,177,097 | 12/1979 | Hudson, Jr. et al. | 264/40.2 |
| 4,244,897 | 1/1981 | Moon | 425/141 |
| 4,428,896 | 1/1984 | Stevenson | 425/141 |
| 4,444,702 | 1/1984 | Thomas et al. | 425/141 |

Primary Examiner—Jon D. Grossman
Attorney, Agent, or Firm—John R. Nelson; Gerald T. Welch

[57] ABSTRACT

A method and apparatus for controlling the average thickness ($\overline{T}_1$) of a film lamina of thermoplastic, dielectric material having a known density ($D_1$) and coextruded at a variable extrusion rate with a foam lamina of similar thermoplastic material having a thickness ($T_2$) and the density of ($D_2$) to form a thermoplastic laminate is disclosed. The apparatus comprises a first gauge for sensing the thickness of the laminate and for providing a caliper signal (C) corresponding to the thickness sensed and a second gauge for sensing the mass/unit-area of the laminate and for providing a mass signal (M) corresponding to the mass/unit-area sensed. The apparatus further comprises a third gauge for sensing a response to the dielectric material and its distribution in the laminate and for providing a dielectric signal (W) corresponding to the response sensed. The apparatus also comprises a computer connected to the first, second and third gauges and responsive to successive sets of signals comprising the caliper signal (C), the mass signal (M) and the dielectric signal (W) for calculating the thickness ($T_1$) of the film lamina according to a specific formula and for comparing an average thickness ($\overline{T}_1$) to a desired thickness ($T_0$) to control the extrusion rate of the film lamina.

19 Claims, 6 Drawing Figures

METHOD AND APPARATUS FOR CONTROLLING THE THICKNESS OF A LAMINA OF A COEXTRUDED LAMINATE

FIELD OF THE INVENTION

This invention relates to controlling the thickness of a film lamina of thermoplastic material coextruded at a variable extrusion rate with a foam lamina of similar thermoplastic material to form a thermoplastic laminate, and more particularly to a method and apparatus therefor.

BACKGROUND OF THE INVENTION

A thermoplastic laminate comprising a film and a foam lamina of similar thermoplastic materials can be formed by a blown bubble coextrusion process. In such process, the film lamina is extruded from the outer annular orifice of a coextrusion die while the foam lamina, consisting of the thermoplastic material mixed with a foaming agent, is simultaneously being extruded from the inner annular orifice of the coextrusion die to form a tubular laminate. As the tubular extrusion leaves the coextrusion die, it is expanded by air under pressure and drawn over a sizing mandrel having diametrically opposed knives which slit the tubing longitudinally on opposite sides thereof to form two separate sheets of laminate. During the coextrusion process, it is desirable to control the average thickness of the film lamina of the laminate independently of the thickness and density of the foam lamina. This is usually accomplished by examining a cross section of the laminate under a microscope to determine the thickness of the film lamina and then, based on the examination, adjusting the rate of extrusion for the film lamina to achieve the desired thickness. Independent measuring was necessary because conventional gauging apparatus could not independently measure the thickness of the film lamina since both laminae were formed from the same or similar thermoplastic materials. For example, a conventional infrared gauge is ineffective because the absorption spectra of the two laminae are similar. Conventional inductive gauges are also ineffective because it depends on an underlying conductive lamina. Conventional capacitive gauges alone cannot distinguish between laminae.

SUMMARY OF THE INVENTION

The instant invention is based on the discovery of a method and apparatus for controlling the average thickness ($\overline{T}_1$) of a film lamina of thermoplastic material having a known density ($D_1$) and coextruded at a variable extrusion rate with a foam lamina of similar thermoplastic material having a thickness ($T_2$) and a density of ($D_2$) to form a thermoplastic laminate. The apparatus comprises a first gauge for sensing the thickness of the laminate which is equal to ($T_1 + T_2$) and for providing a corresponding caliper signal (C), and a second gauge for sensing the mass/unit-area of the laminate which is equal to the sum of the products $[(T_1)(D_1) + (T_2)(D_2)]$ and for providing a corresponding mass signal (M). The apparatus also comprises a third gauge having a response to the dielectric material and its distribution in the laminate which is equal to the following expression:

$$(K)[f(T_1)] + (D_2/D_1)[f(C) - f(T_1)],$$

for providing a dielectric signal (W), where (K) is a ratio of the dielectric effect of the solid material per unit-volume in each lamina and both f(C) and f($T_1$) are functions derived to approximate empirical data measured by the third gauge. The instant invention recognizes that there are three unknowns, ($T_1$), ($T_2$) and ($D_2$), and uses a computer to process three equations to solve for the three unknowns focusing specifically on the thickness of the film lamina ($T_1$). Therefore, the apparatus further comprises a computer connected to the gauges and having a memory containing the value of the density ($D_1$) of the film lamina, the value of the ratio (K) and the values associated with each of the functions f(C) and f($T_1$). The computer upon receiving successive sets of signals comprising the caliper signal (C), the mass signal (M) and the dielectric signal (W), calculates the thickness ($T_1$) of the film lamina, as well as the thickness ($T_2$) and density ($D_2$) of the foam lamina. The computer compares an average thickness ($\overline{T}_1$) of the calculated thicknesses ($T_1$) to a desired thickness ($T_0$) and provides a first control signal when the average thickness ($\overline{T}_1$) is greater than the desired thickness ($T_0$) and a second control signal when the average thickness ($\overline{T}_1$) is less than the desired thickness ($T_0$). The apparatus finally comprises means connected to the computer which is responsive to the first control signal to decrease the extrusion rate of the film lamina and responsive to the second control signal to increase the extrusion rate of the film lamina. Although it is an object of the invention to first provide a real-time computation of the thickness profile and the average thickness ($\overline{T}_1$) of the film lamina, it is a further object of the invention to control the extrusion rate for the film lamina in response thereto as described above.

DETAILED DESCRIPTION OF THE INVENTION

Figure 1:
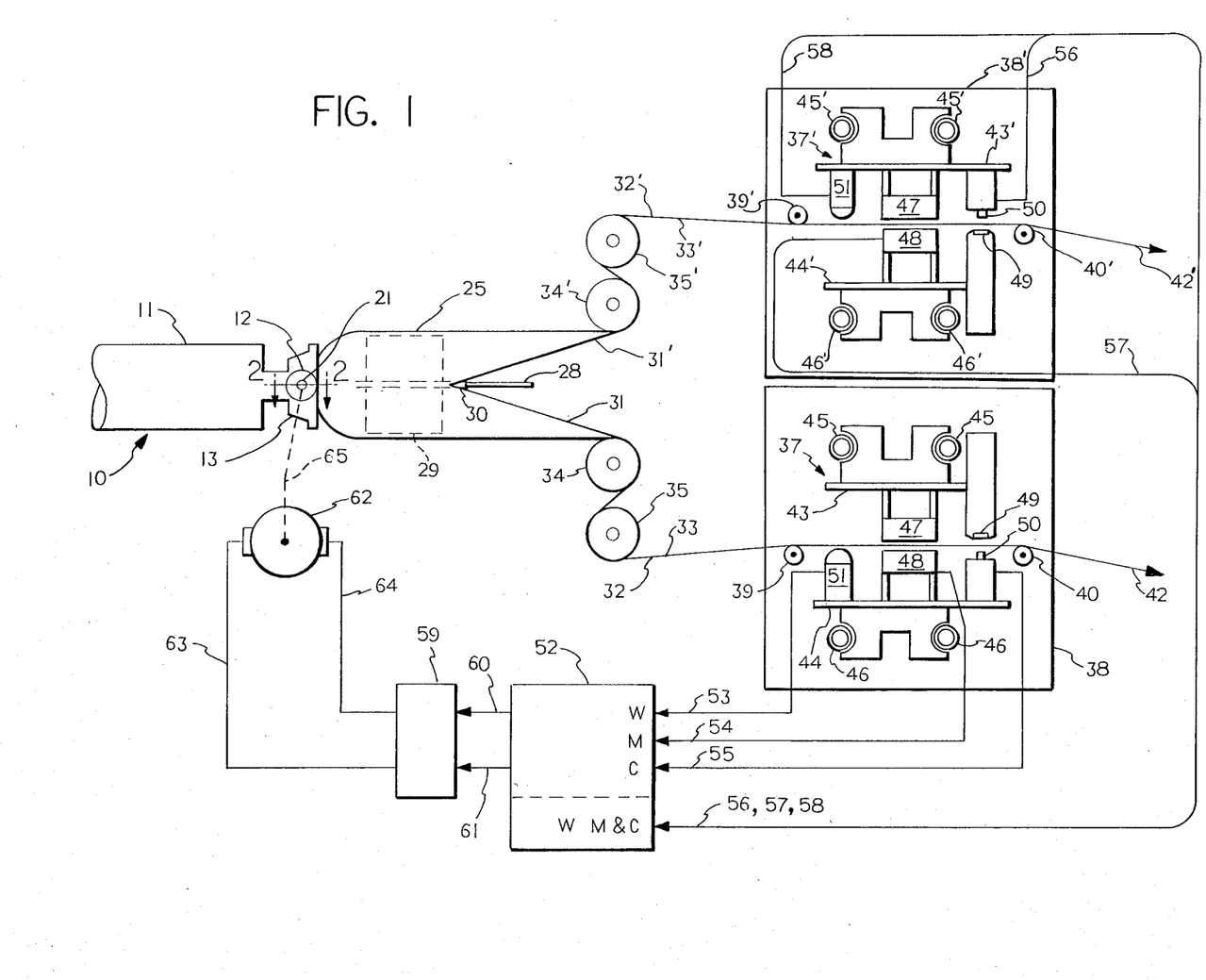
FIG. 1 is a partially schematic side view of a coextrusion system, a gauging station and an electronic control device for controlling the thickness of the film lamina of a thermoplastic laminate according to the invention.
Figure 2:
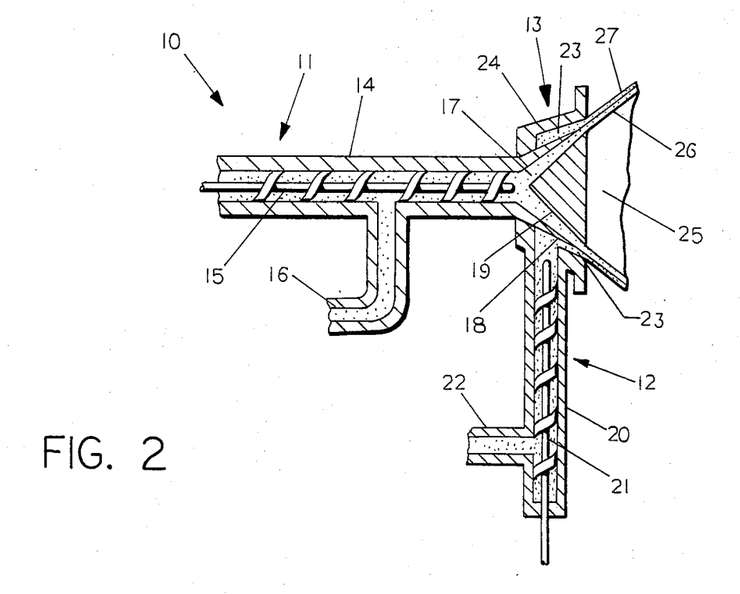
FIG. 2 is a partially schematic, horizontal section of the coextruder of FIG. 1 taken along the line 2—2.

Referring to FIG. 1, a coextrusion system is indicated generally at 10 and is operated to extrude a cellular thermoplastic material and a noncellular thermoplastic material to form a laminate having a foam lamina and a film lamina. The thermoplastic material is a dielectric material which can be, for example, polystyrene. Cellular polystyrene is produced by mixing particulate polystyrene with a foaming agent to form the foam lamina when extruded. The coextrusion system 10 comprises a foam extruder 11 for cellular thermoplastic material and a skin extruder 12 for the noncellular thermoplastic material, both of which are connected to a die 13. Referring in more detail to FIG. 2, the foam extruder 11 comprises a barrel 14 and screw 15 housed therein. Thermoplastic material is fed into the barrel 14 through a port 16. The foaming agent is also fed into the barrel 14 through a port (not shown) so that it is in solution with the thermoplastic material. The screw 15 forces the thermoplastic material and the foaming agent into an annular orifice 17 of the die 13. The annular orifice 17 is formed within a die ring or funnel 18 by a die cone 19 disposed therein. The skin (or film) extruder 12 for the noncellular material also comprises a barrel 20 and a screw 21 housed therein. The screw 21 is fed thermoplastic material from a port 22 and forces it into the die 13 through an annular orifice 23. The orifice 23 is formed within a die cup 24 by the outer surface 18 which is shrouded within the die cup 24. The structure of the coextrusion system 10 shown is conventional and, therefore, has been illustrated in schematic form. The die 13 produces a tubular laminate extrusion 25 having a cellular or foam lamina 26 on the inside and a noncellular or film lamina 27 on the outside.

Referring back to FIG. 1., which for clarity does not show the feeding ports 16 and 22, the tubular laminate 25 is expanded as it leaves the die 13 by air under pressure supplied through a conduit 28 and then drawn over a sizing mandrel 29. The tubular laminate 25 then passes a pair of diametrically opposed knives, one of which is shown at 30, which slit the tubular laminate 25 longitudinally on opposite sides thereof into separate sheets of laminate 31 and 31', each having a film lamina 32 and 32', respectively, and a foam lamina 33 and 33', respectively, as described above. The laminates 31 and 31' are flattened and passed over pull rollers 34, 35, 34' and 35' to gauging stations indicated generally at 37 and 37'. The gauging stations 37 and 37' are mounted on a gauging stand 38 which supports guide rollers 39, 40, 39' and 40' which properly position the laminates 31 and 31', respectively, within the gauging stations 37 and 37'. The laminates 31 and 31' then continue in the direction indicated by arrows 42 and 42', respectively, and ultimately are wound on take-up rollers (not shown).

For the purpose of clarity, only the lower gauging station 37 will be described since the upper station 37' is identical equipment. The gauging station 37 comprises an upper and lower carriage assembly 43 and 44, respectively, each of which is slideably mounted on a pair of tubular rails 45 and 46, respectively, supported by the gauging stand 38. The opposing carriages 43 and 44 are both driven by a motor (not shown) to move simultaneously in phase following a horizontal path which is perpendicular to the direction of extrusion indicated by the arrow 42. The movement of the carriages 43 and 44 must be synchronized because they carry complementary portions of gauges, e.g., source and detector, which must be kept in alignment as they traverse and scan the laminate 31. The gauging station 37 and the apparatus associated therewith as described above is commonly known as an "O-frame scanner" which has been available as a unit from the Fife Division of Clausing Corporation located in Oklahoma City, Okla. Referring now in more detail to the gauges mounted on the carriages 43 and 44, a gauge for measuring the mass/unit-area of the thermoplastic material comprises a source 47 for emitting beta radiation mounted on the upper carriage 43 and a corresponding detector 48 for sensing the transmitted radiation opposingly mounted on the lower carriage 44. This gauge has also been available from the Fife Division as a unit under model number KAC4. The gauge is used to sense the mass/unit-area (M) of the laminate 31 as it travels between the source 47 and the detector 48 and, with proper linearization, provides a mass signal proportional to the mass/unit-area (M). M is related to the thickness and density of the two laminae 32 and 33 according to an equation EQ #1, as follows:

$$M = (T_1)(D_1) + (T_2)(D_2)$$

where ($T_1$) and ($T_2$) are the thickness of the film lamina 32 and the foam lamina 33, respectively, and ($D_1$) and ($D_2$) are the densities of the film lamina 32 and the foam lamina 33, respectively. A gauge for measuring the thickness or caliper of the laminate 31 comprises an aluminum target 49 mounted on the upper carriage 43 and a proximity probe 50 mounted on the lower carriage 44. The face of the probe 50 and the target 49 lightly contact opposite sides of the laminate 31. The probe and associated electronics have been available as a unit under model number KD2310-2S from Kaman Science's Corporation located at Boulder, Colo. This gauge senses the thickness or caliper (C) of the laminate 31 as it travels between the target 49 and the probe 50 and provides a caliper signal proportional to the thickness (C). C is related to the thickness of the two laminae 32 and 33 according to an equation, EQ #2, as follows:

$$C = T_1 + T_2.$$

Finally, a gauge 51 having a response (W) to the dielectric material and its distribution in the laminate 31 is mounted on a lower carriage 44. The gauge 51 is a modified version of model 40B which has been available from Winzen International, Inc., located in Minneapolis, Minn. The modifications and electronics associated with this gauge will be discussed below. The modified gauge 51 responds to the change in capacitance due to the presence of the laminate 31 as it travels over the gauge 51 and provides a dielectric signal proportional to the response (W) corresponding to the augmented dielectric sensed. In the preferred embodiment, the face of the gauge 51 contacts film lamina 32 of the laminate 31. The output of each gauge 51, 48 and 50 is electrically connected to a controller 52 via electrical cables 53, 54 and 55, respectively. The gauges supported by the upper gauging station 37' are also electrically connected to the controller 52 via electrical cables 56, 57 and 58.

The control unit 52 is responsive to the dielectric signal (W), the mass signal (M), and the caliper signal (C) received from the gauges and calculates the thickness ($T_1$) of the film laminae 32 and 32'. The control 52 then computes an average thickness ($\overline{T}_1$) based on a predetermined number of sets of signals provided and compares the average thickness ($\overline{T}_1$) to a desired thickness ($T_0$) to provide a first control signal when the average thickness ($\overline{T}_1$) is greater than the desired thickness ($T_0$) and second control signal when the average thickness ($\overline{T}_1$) is less than the desired thickness ($T_0$). The control unit 52 is electrically connected to a driver circuit 59 by wires 60 and 61, which is electrically connected to a motor 62 via wires 63 and 64. The motor 62 is mechanically coupled to the screw 21 of the skin extruder 12 as indicated by a dashed line 65. The speed of the motor 62 increases in response to the second control signal to increase the extrusion rate of the film laminae 32 and 32' and decreases in response to the first control signal to decrease the extrusion rate of the film laminae 32 and 32'. When the speed of the motor 62 increases, the extrusion rate of the film laminae 32 and 32' and the thickness ($T_1$) of the film laminae 32 and 32' are increased independently of the thickness ($T_2$) of the foam laminae 33 and 33'. Correspondingly, when the speed of the motor 62 decreases, the extrusion rate of the film laminae 32 and 32' and the thickness ($T_1$) of the film laminae 32 and 32' are independently decreased.

Figure 3:
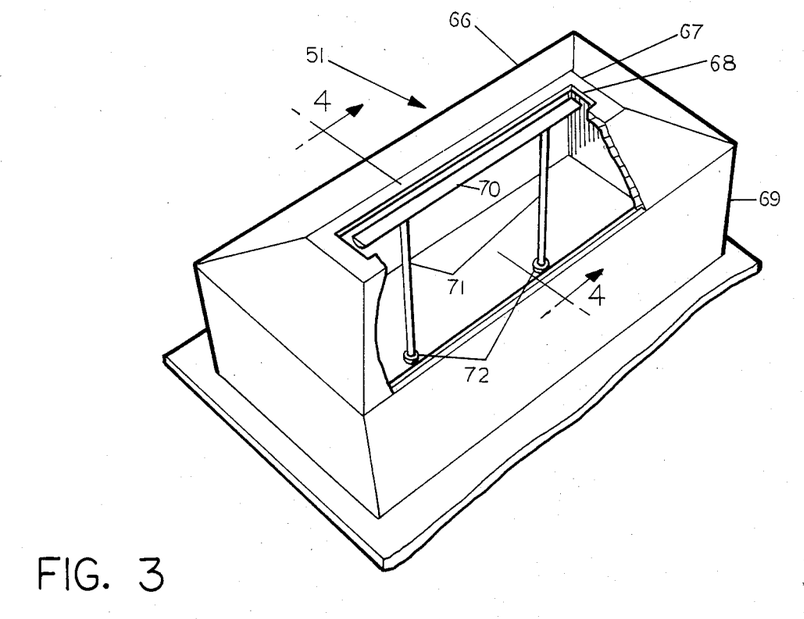
FIG. 3 is a partially schematic, perspective view of a gauge mounted on the gauging station of FIG. 1 for sensing the augmented dielectric contribution of the laminate and a breakaway view showing the internal construction of the gauge in accordance with the invention.
Figures 4, 5:
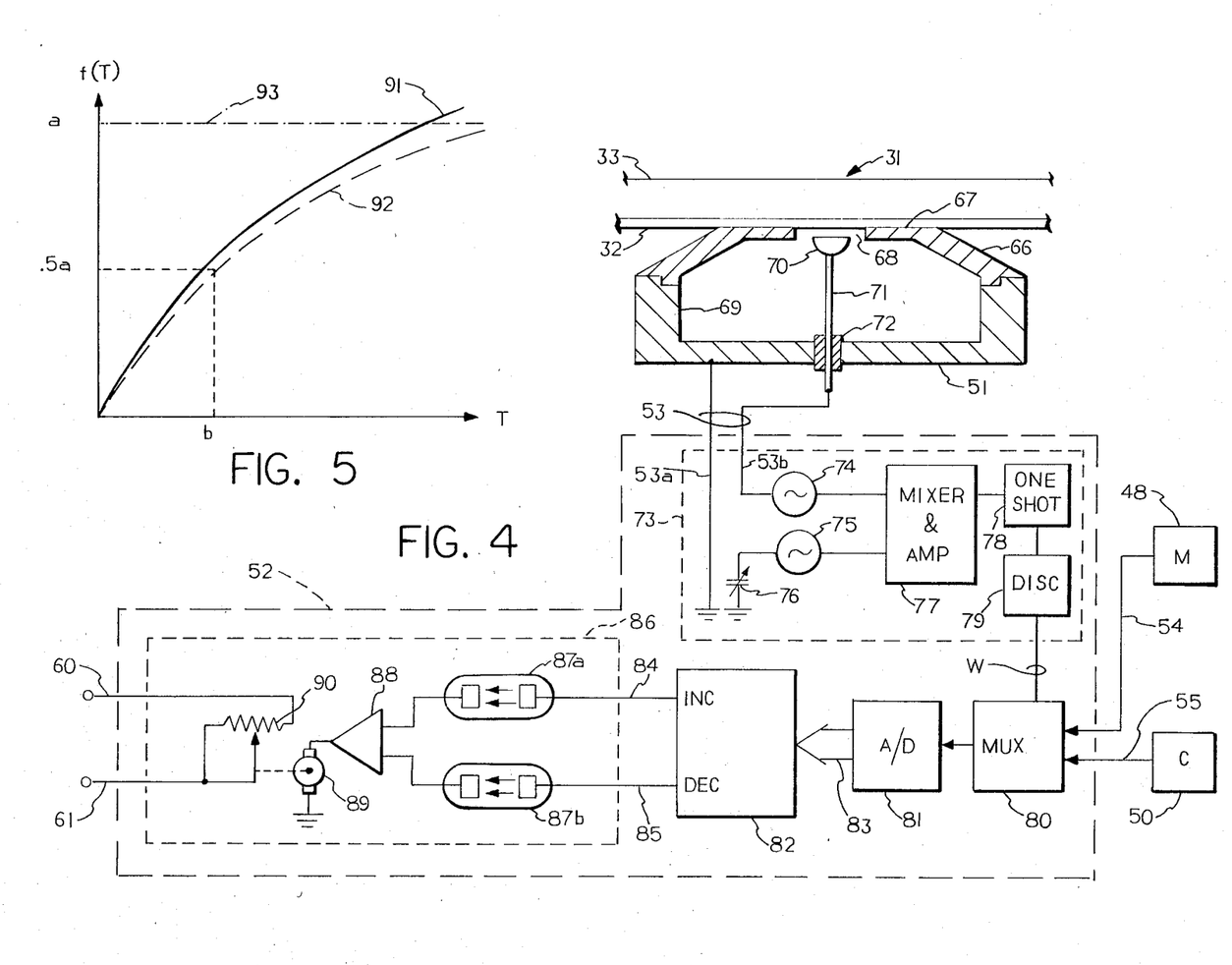
FIG. 4 is a partially schematic, vertical section of the gauge of FIG. 3 taken along the line 4—4 and an electrical schematic of a portion of the electric device for controlling the thickness of a film lamina according to the invention.
FIG. 5 is a graph showing f(T) as a function of (T) according to the invention.

Now that the system has been described generally, a description will now focus on details of the gauge 51 for sensing dielectric contribution and the control unit 52 receiving dielectric signals therefrom. Referring in more detail to FIGS. 3 and 4, the gauge 51 for sensing the dielectric contribution comprises a conductive plate 66 having a protruding surface 67 and a longitudinal slot 68 extending therethrough. The gauge 51 further comprises a housing 69 on which the plate 66 is mounted and an electrically conductive bar 70 contained within the slot 68 of the plate 66 so that it is adjacent but not touching the walls of the slot 68 of the plate 66. The bar 70 is supported by electrically conductive posts 71 which extend through insulators 72 mounted in and extending through the housing 69. Referring more specifically to FIG. 4, the plate 66 and bar 70 are electrically connected to the control unit 52 via cable 53 comprising wires 53a and 53b respectively, which are connected to a circuit 73 within the control 52. The wire 53a is electrically grounded and the wire 53b is connected to the frequency-determining input of a first oscillator 74. The frequency-determining input of a second oscillator 75 is connected to a grounded adjustable capacitor 76. The oscillators 74 and 75 are connected to a suitable frequency mixer 77 which also contains an amplifier circuit. When the gauge 51 is positioned so that the surface 67 of the plate 66 is contiguous with the film lamina 32 of the laminate 31, the bar 70 is adjacent but incontiguous with the film lamina 32. The plate 66, bar 70 and laminate 31 function as a capacitor having a value($C_v$) which determines the frequency of the first oscillator 74, while the adjustable capacitor 76 can be used to independently shift the frequency of the second oscillator 75. In operation, the gauge 51 is normalized by adjusting the frequency of the second oscillator 75 to be equal to that of the first oscillator 74 when the gauge 51 is removed from the laminate 31. When the gauge 51 is repositioned so that the surface 67 of the plate 66 is contiguous with the film lamina 32, the frequency of the first oscillator 74 changes in response to the presence of a dielectric material. The output from the mixer 77 in turn provides a signal having a frequency equal to the difference between the frequencies of the oscillators 74 and 75 to a one-shot multivibrator 78. The multivibrator then provides an output train of pulses having a period equal to that of the low frequency signal to a discriminator 79 which provides a d.c. voltage of varying amplitude proportional to the frequency of pulses received from the multivibrator 78. This frequency-to-voltage circuit 73 has also been available from the Winzen International Company. The output of the discriminator 79, the analog of the response (W), is connected to the input of an analog multiplexer 80.

The outputs of the other gauges 48 and 50 are also connected to the inputs of the multiplexer 80 via the wires 54 and 55, respectively, which provide the multiplexer 80 with the mass signal (M) and the caliper signal (C), respectively, sensed by the gauges 48 and 50. The multiplexer 80 is connected to an analog-to-digital (A/D) converter 81 which sequentially presents the caliper (C), mass (M) and dielectric (W) numbers in parallel binary form to a computer 82 via a bus 83. The computer 82 can be a microprocessor-based unit such as, for example, the LSI 11 which has been available from the Digital Equipment Corporation located at Maynard, Mass. The computer 82 interfaces with a parallel input/output board (not shown) which has been available from the ADAC Corporation located at Woburn, Me. The computer 82 has two outputs 84 and 85 which provide an increase signal (INC) and a decrease signal (DEC), respectively, to means contained by a dashed line 86 and responsive to the increase signal (INC) for increasing the extrusion rate of the film lamina 32 and responsive to the decrease signal (DEC) for decreasing the extrusion rate of the film lamina 32. More specifically, the outputs 84 and 85 are connected to optical isolators 87a and 87b, each of which can be, for example, a photoemissive diode functioning as a transmitter and a phototransister functioning as a receiver. The optical isolators 87a and 87b are connected to inputs of an amplifier 88 which drives a small direct current motor 89 coupled to a rotary potentiometer 90. The motor 89 and the potentiometer 90 have available as a unit form the Beckman Instruments Corporation, located at Fullerton, Calif. The output across the potentiometer 90 is the output of the control unit 52 provided along the wires 60 and 61.

As already discussed, the capacitance ($C_v$) of the gauge 51 changes in the presence of a dielectric material. As received from the manufacturer, the gauge 51 has a response that is almost linear over a range of thicknesses (T) of a sheet of homogeneous thermoplastic material, i.e., noncellular and nonlaminated material, and a bar 70 essentially flush with the lip of the slot 68 so that both contact the sheet. However, it has been discovered that useful measurements of coextruded thermoplastic material can be obtained when the surface 67 of the plate 66 is positioned contiguous with the film lamina 32 of the coextruded laminate 31 and when the bar 70 is slightly recessed within the slot 68 of the plate 66 so that it is adjacent but incontiguous with the film lamina 32; this causes the gauge 51 to operate in a "more nonlinear" fashion.

The desirability of enhancing the nonlinearity of the response of the gauge 51 may be understood by noting the following: if the response of the gauge 51 were strictly proportional to the thickness-density product, it would be proportional to the mass/unit-area and provide the same information as the mass signal (M). A nonlinear response, f(T), provides information about the distribution of dielectric material through the thickness (T) of a sheet of homogeneous material. Therefore, the nonlinear response f(T) is empirically determined as illustrated by a graph 91 in FIG. 5. The shape of the data curve 91 indicates that the sensitivity f(T) of the gauge 51 to the presence of dielectric material decreases with greater distance therefrom. Rather than storing all the empirical data in the computer 82, the data curve 91 is approximated by calculating the coefficients of a selected model to best fit the empirical data measured by the gauge 51. For example, the data curve 91 can be approximated by a model wherein $$f(T) = aT/(b+T) \qquad 5$$

as illustrated by a dashed line 92, where (a) is the calculated asymptote as illustrated by a dotted-dashed line 93. Using this model, f(T) is equal to 0.5a when T is equal to (b). The data curve 91 can also be approximated by a model wherein $$f(T) = m(1 - e^{-T/n})$$

where (m) is the calculated asymptote. Using this model, f(T) is equal to approximately 0.67m when T is equal to (n). In either case, the model is used to approximate the data curve 91 so that $f(T_1)$ and $f(C)$ can be determined according to following equations:

$$f(T_1) = f(T)\Big|_{T=T_1} \text{ and } f(C) = f(T)\Big|_{T=C}$$

where $C = T_1 + T_2$ according to EQ #2. For example, substituting the values $T_1$ and C in the first model produces the following equations:

EQ #4: $f(T_1) = aT_1/(b+T_1)$ and

EQ #5: $f(C) = aC/(b+C)$, the coefficients of which are approximated to best fit the empirical data measured by the gauge 51.

It has been found that the gauge 51 responds to the dielectric parameters of the film lamina 32 and the foam lamina 33 of the laminate 31 according to an equation, EQ #5, as follows:

$$W = (K)[f(T_1)] + (D_2/D_1)[f(T_2+T_1) - f(T_1)],$$

which, when combined with EQ #1 and EQ #2 above, eliminates two of the three unknowns, ($T_2$) and ($D_2$), and is reduced to the following equation, EQ #6:

$$W = (K)[f(T_1)] + \left( \frac{(M - T_1 D_1)}{(C - T_1)} \right) \frac{[f(C) - f(T_1)]}{D_1}$$

in which ($T_1$) is the only unknown, since the density ($D_1$) of the film lamina 32 is known and relatively constant. The constant (K) represents any difference between the dielectric constants of the material of the film lamina 32 and the solid material of the foam lamina 33. The constant (K) is equal to the ratio of the dielectric effect of the solid, noncellular material per unit-volume in each of the laminae 32 and 33 according to the formula:

$$K = (k_1 - k_0)/(k_2 - k_0)$$

where ($k_0$) is the dielectric constant of air, ($k_1$) is the dielectric constant of the film lamina 32, and ($k_2$) is the dielectric constant of the thermoplastic material from which the cellular material is mixed to extrude the foam lamina 33. It has also been discovered that EQ #6 can be further simplified by replacing the function $[f(C) - f(T_1)]/D_1$ by a constant Q. However, the preferred embodiment solves EQ #6 for ($T_1$) using EQ #2 and EQ #3 to produce an equation, EQ #7, as follows:

$$T_1 = \frac{b[aM - WD_1(b+C)]}{WD_1(b+C) + aD_1(b - Kb - KC)}$$

where the memory of the computer 82 stores only the value of the density ($D_1$) of the film lamina 32, the value of the ratio (K) and the constants (a) and (b).

Figure 6:
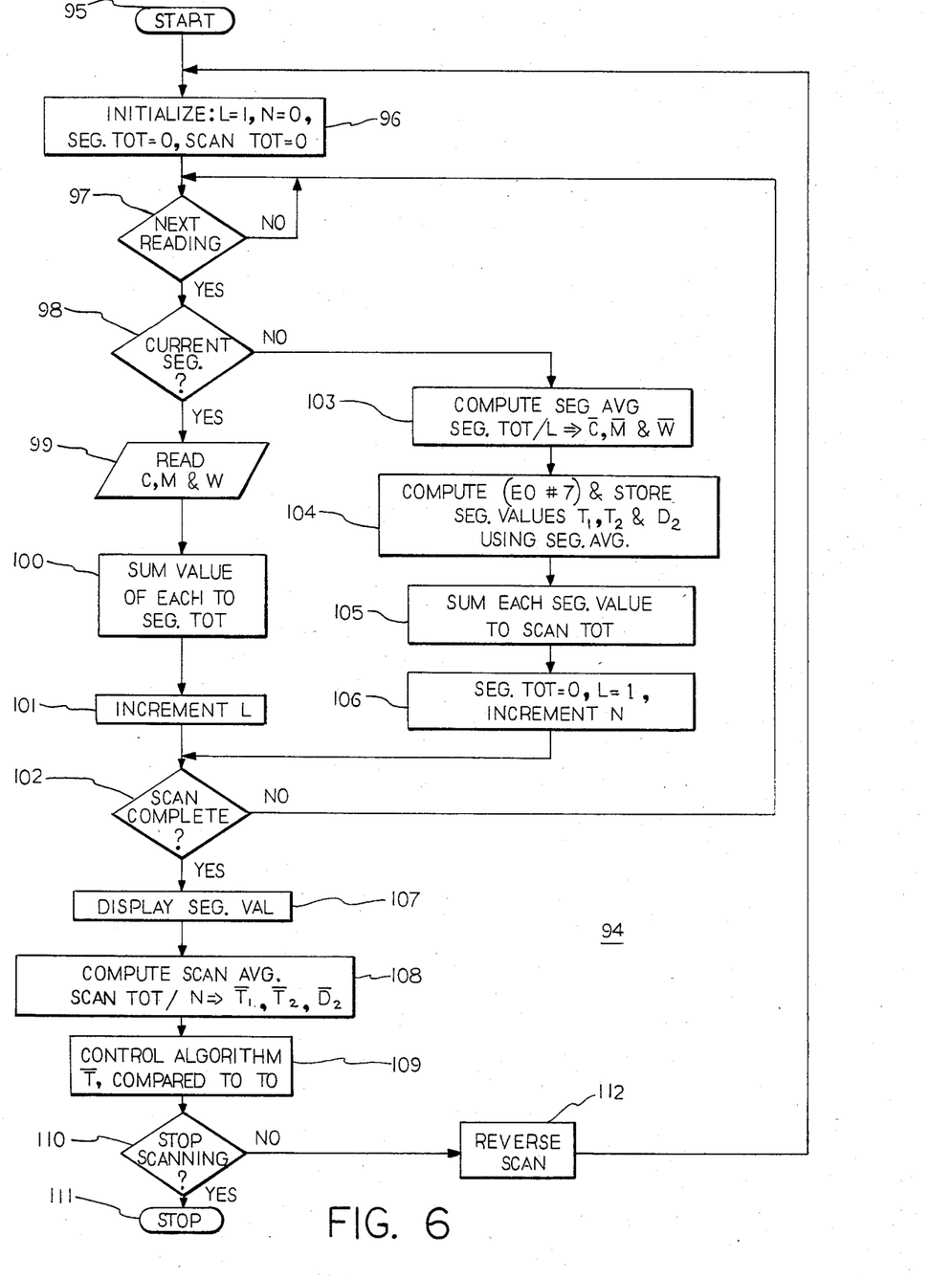
FIG. 6 is a simplified logic flowchart of a portion of the program in a computer for processing information received from gauges mounted on the gauging station of FIG. 1 to determine the thickness of the film lamina and provide control signals corresponding thereto in accordance with the invention.

The computer 82 is used for processing the caliper signal (C), the mass signal (M) and the dielectric signal (W) provided by the gauges, for evaluating the thickness ($T_1$) of the film lamina 32 according to EQ #7 and then providing control signals to increase or decrease the rate of extrusion in response thereto. FIG. 6 shows a simplified logic flowchart of a portion of the program indicated generally at 94 used in the computer 82 to accomplish the functions above. Prior to program operation the width of the laminate 31 is divided into a fixed number of segments and the boundaries of these segments are calculated as scanner positions. When the program begins at 95, a data count L is initialized to equal one, while a segment count N, SEG TOT and SCAN TOT are initialized to equal zero at 96. The segments (SEG) in which the width of the laminate is divided is counted and indicated by a count N in the computer and the program is provided with a system for comparing the segment total (SEG TOT) and the scan total (SCAN TOT) to determine if the segments have all been scanned in order to be certain that an average $\overline{T}_1$ is ready in the computer. An internal clock (not shown) is then checked at 97 to determine if sufficient time has elapsed since the last reading to again read the gauges 48, 50 and 51. If sufficient time has not elapsed, the program branches at NO and loops back to 97 to again check the time. If sufficient time has elapsed since the last reading, the program 94 branches at YES to 98 to determine whether the scanner position is within the current one of a plurality of segments comprising a full scan of the laminate 31. For example, the computer 82 may take an average of 5 readings per segment, with a resultant average data count L equal to 5. For a scan having 40 segments, the final segment count N equals 40. If the program 94 is still in the current segment, the program 94 branches at YES to read the caliper signal (C), the mass signal (M) and the dielectric signal (W) at 99. Each value is then summed into its corresponding segment total, SEG TOT, at 100 to provide a summation value for each over the entire segment. The program 94 then increments the data count L at 101 and enters a decision point at 102 to determine whether the scan is complete by checking the segment count N. If the scan is not complete, the program 94 branches at NO back to 97 to check whether enough time has elapsed to take the next reading.

The program 94 continues reading sets of the signals (C), (M), and (W) until L sets of such data are read. When this occurs, the program 94 is no longer in the current segment 98 and branches at NO to enter a processing function at 103. At this point, the segment averages, SEG AVG, for each value are calculated by dividing the segment total of each value, SEG TOT, by the data count L to provide the following values:

$$\overline{C} = \sum_{i=1}^{L} C_i/L; \ \overline{M} = \sum_{i=1}^{L} M_i/L; \text{ and } \overline{W} = \sum_{i=1}^{L} W_i/L.$$

The program 94 next enters a processing function at 104 which uses the segment averages, $\overline{C}$, $\overline{M}$, and $\overline{W}$ to calculate the thickness ($T_1$) of the lamina 32 according to the equation EQ #7 as described hereinabove. The thickness ($T_2$) and the density ($D_2$) of the foam lamina 33 are also calculated according to EQ #2 and EQ #1, respectively. The program 94 then stores the segment values, $T_1$, $T_2$ and $D_2$, and enters another processing function at 105 where each of the segment values is summed into a corresponding scan total, SCAN TOT. The program 94 then reinitializes SEG TOT and L at 106 in preparation for taking readings for the next segment in the scan and also increments the scan count N to tabulate the number of segments that have been completed.

The program 94 reenters the decision point at 102 to determine whether a full scan has been completed, e.g., is the scan count N equal to 40 segments. If the scan is complete, the program 94 branches at YES and enters a processing function at 107 to display the segment values, $T_1$, $T_2$ and $D_2$. It has been discovered that a graphical display of these values during the coextrusion operation is very useful to an operator in addition to the direct, closed-loop control of the extrusion rate of the film lamina 32. The program 94 then enters a processing function at 108 in which the scan averages, SCAN AVG, of each scan value is computed by dividing each scan total, SCAN TOT, by the segment count N to provide the following values:

$$\overline{T}_1 = \sum_{i=1}^{N} T_{1i}/N; \ \overline{T}_2 = \sum_{i=1}^{N} T_{2i}/N; \text{ and } \overline{D}_2 = \sum_{i=1}^{N} D_{2i}/N.$$

The average thickness ($\overline{T}_1$) of the film lamina 32 is the controlled value which is compared to a desired thickness ($T_0$) for the film lamina 32 when the program 94 enters a processing function at 109 containing an algorithm to control the rate of extrusion for the film lamina 32. According to the algorithm, if the average thickness ($\overline{T}_1$) is greater than the desired thickness ($T_0$), the computer 82 provides the decrease control signal (DEC) to decrease the rate of extrusion for the film lamina 32. If the average thickness ($\overline{T}_1$) is less than the desired thickness ($T_0$), the computer 82 provides the increase control signal (INC) to increase the rate of extrusion. After the extrusion rate has been increased or decreased, the program 94 enters a decision point at 110 to determine if the operator desires to stop the scanning. If the desire to stop the scanning, the program 94 would branch at YES and stop. Otherwise, the program 94 branches at NO to reverse the direction of scanning at 112 and loop back to 96 to begin the next scan.

The foregoing disclosure is the best mode devised by the inventor for practicing this invention. It is apparent, however, to one skilled in the pertinent art that various changes may be made in details of construction from those shown in the attached drawings and discussed in conjunction therewith without departing from the spirit and scope of this invention. For example, the invention is not limited to the coextrusion art; it can be practiced in other processes. Also in the coextrusion process, the output can be used to control input variables other than the extrusion rate. The detail in the foregoing disclosure is intended to enable one skilled in the pertinent art to practice the instant invention. Therefore, it is to be understood that this invention is not to be limited to the specific details shown and described.

What we claim is:

1. Apparatus for controlling the average thickness ($\overline{T}_1$) of a film lamina of thermoplastic material having a known density ($D_1$) and coextruded at a variable extrusion rate with a foam lamina of similar thermoplastic material having a thickness ($T_2$) and a density ($D_2$) to form a thermoplastic laminate comprising:
    a first gauge for sensing the thickness of the laminate which is equal to ($T_1+T_2$) and for providing a caliper signal (C) corresponding to the thickness sensed;
    a second gauge for sensing the mass/unit-area of the laminate which is equal to ($T_1$)($D_1$)+($T_2$)($D_2$) and for providing a mass signal (M) corresponding to the mass/unit-area sensed;
    a third gauge for sensing a response to said thermoplastic material and its distribution in the laminate and for providing a dielectric signal (W) corresponding to the response which is equal to [(a)($T_1$)/(b+$T_1$)][K−($D_2/D_1$)] where (K) is a ratio of the dielectric effect of the solid material in each lamina and (a) and (b) are coefficients approximated to best fit empirical data measured by said gauge, said gauge being positioned adjacent the film lamina and the sensitivity of said gauge decreasing with the distance therefrom;
    a computer having a memory containing the value of the density ($D_1$) of the film lamina, the value of the ratio (K) and the values of the coefficients (a) and (b), said computer being connected to said first, second, and third gauges and being responsive to successive sets of signals comprising the caliper signal (C), the mass signal (M) and the dielectric signal (W) for calculating the thickness ($T_1$) of the film lamina according to the formula:

$$T_1 = \frac{(b)[aM - WD_1(b + C)]}{WD_1(b + C) + aD_1(b - Kb - KC)}$$

combined from the equalities associated with each signal received, and then for comparing an average thickness ($\overline{T}_1$) of the calculated thicknesses ($T_1$) to a desired thickness ($T_0$) and providing a first control signal (DEC) when the average thickness ($\overline{T}_1$) is greater than the desired thickness ($T_0$) and a second control signal (INC) when the average thickness ($\overline{T}_1$) is less than the desired thickness ($T_0$); and
    means connected to said computer and responsive to the first control signal (DEC) for decreasing the extrusion rate of the film lamina and responsive to the second control signal (INC) for increasing the extrusion rate of the film lamina.

2. Apparatus as recited in claim 1 wherein said third gauge comprises an electrically conductive plate having a surface contiguous with the film lamina, said conductive plate having a longitudinal slot extending therethrough, an electrically conductive bar positioned within said slot of said conductive plate but physically spaced from both the conductive plate and the film lamina, and means electrically connected to said plate and said bar for providing the dielectric signal (W).

3. Apparatus as recited in claim 1 wherein said caliper signal (C), mass signal (M) and dielectric signal (W) are analog and said apparatus further comprises an analog multiplexer connected to said first, second and third gauges for receiving the signals provided therefrom and an analog-to-digital converter connected between said multiplexer and said computer whereby the analog signals (C), (M) and (W) are sequentially presented to said computer in parallel binary form.

4. Apparatus as recited in claim 1 further comprising a carriage on which said gauges are mounted to scan the laminate while traversing the width thereof, and wherein said multiplexer during the scan provides said converter with successive sets of sequential signals from said gauges, and said computer calculates the thickness ($T_1$) of the film lamina for sets (L) of signals comprising a segment of the scan and then computes the average thickness ($\overline{T}_1$) for a predetermined number (N) of segments of the scan.

5. Apparatus as recited in claim 1 further comprising means for displaying the calculated thickness ($T_1$) for each segment of said scan.

6. A method using a computer for controlling the average thickness ($\overline{T}_1$) of a film lamina of thermoplastic material having a known density ($D_1$) and coextruded at a variable extrusion rate with a foam lamina of similar thermoplastic material having a thickness ($T_2$) and a density ($D_2$) to form a thermoplastic laminate, comprising the steps of:

sensing the thickness of the laminate which is equal to ($T_1+T_2$) and providing a caliper signal (C) corresponding to the thickness sensed;

sensing the mass/unit-area of the laminate which is equal to $[(T_1)(D_1)+(T_2)(D_2)]$ and providing a mass signal (M) corresponding to the mass/unit-area sensed;

sensing a response to said thermoplastic material and its distribution in the laminate and providing a dielectric signal (W) corresponding to the response which is equal to $(K)[f(T_1)]+(D_2/D_1)[f(C)-f(T_1)]$ where (K) is a ratio of the dielectric contribution from each lamina and both f(C) and $f(T_1)$ are functions derived to approximate empirical data sensed previously;

storing in the computer the value of the density ($D_1$) of the film lamina, the constant (K) which is the ratio of the dielectric effect of the solid material in each lamina and the functions $f(T_1)$ and f(C);

providing the computer with successive sets of signals comprising the caliper signal (C), the mass signal (M) and the dielectric signal (W); enabling the computer upon receipt of the signals to calculate the thickness ($T_1$) of the film lamina according to the formula:

$$W = (K)[f(T_1)] + \left( \frac{(M - T_1 D_1)}{(C - T_1)} \right) \frac{[f(C) - f(T_1)]}{D_1}$$

combined from the equalities associated with each signal received, to compare an average thickness ($\overline{T}_1$) of the calculated thicknesses ($T_1$) to a desired thickness ($T_0$), and to provide a first control signal (DEC) when the average thickness ($\overline{T}_1$) is greater than a desired thickness ($T_0$) and a second control signal (INC) when the average thickness ($\overline{T}_1$) is less than the desired thickness ($T_0$); and adjusting the extrusion rate for the film lamina to decrease the rate in response to the first control signal (DEC) and to increase the rate in response to the second control signal (INC).

7. The method as recited in claim 6 wherein the step for sensing a response to the dielectric material is accomplished adjacent the film lamina with a decreasing sensitivity for increasing distance.

8. The method as recited in claim 6 or 7 wherein the step for sensing a response to said thermoplastic material includes the steps of positioning the surface of an electrically conductive plate having a longitudinal slot extending therethrough contiguous with the film lamina, positioning an electrically conductive bar within said slot of said conductive plate but physically spaced from both the conductive plate and the film lamina, and electrically connecting the plate and the bar to the computer for providing the dielectric signal (W) thereto.

9. The method as recited in claim 6 or 7 wherein said caliper signal (C), said mass signal (M) and said dielectric signal (W) are analog and said method further comprises the steps of multiplexing the sensed analog signals (C), (M) and (W) and converting the sequential signals received therefrom to binary signals in parallel form for presentation to the computer.

10. The method as recited in claim 9 further comprising the steps of scanning the width of the laminate while being extruded, multiplexing successive sets of sensed sequential signals, and enabling the computer upon receipt of the binary signals to calculate the thickness ($T_1$) of the film lamina for sets (L) of signals comprising a segment of the scan and then compute the average thickness ($\overline{T}_1$) for a predetermined number (N) of segments of the scan.

11. The method as recited in claim 10 further comprising the step of displaying the calculated thickness ($T_1$) for each segment of said scan.

12. In a system for controlling the average thickness ($\overline{T}_1$) of a film lamina of a thermoplastic material having a known density ($D_1$) and coextruded at a variable extrusion rate with a foam lamina of similar thermoplastic material having a thickness ($T_2$) and a density ($D_2$) to form a thermoplastic laminate having a thickness ($T_1+T_2$) providing a caliper signal (C), apparatus comprising:

means for sensing a response to said thermoplastic material and its distribution in the laminate, said sensing means being positioned adjacent the film lamina with a decreasing sensitivity for increasing distance therefrom and an electrically conductive plate having a surface contiguous with the film lamina and a longitudinal slot extending therethrough, an electrically conductive bar positioned within the slot of said plate adjacent but physically spaced from both the conductive plate and the film lamina; and means electrically connecting said plate and said bar for providing a dielectric signal (W).

13. Apparatus as recited in claim 12, wherein said sensing means provides a dielectric signal equal to $(K)[f(T_1)]+(D_2/D_1)[f(C)-f(T_1)]$ where (K) is a ratio of the dielectric effect of the solid material in each lamina and both f(C) and $f(T_1)$ are functions derived to approximate empirical data measured by said sensing means.

14. Apparatus as recited in claim 13 wherein said function $f(T_1)$ is equal to $aT_1/(b+T_1)$ and said function f(C) is equal to $aC/(b+C)$ where (a) and (b) are approximated to best fit empirical data measured by said third gauge.

15. Apparatus as recited in claim 13 wherein said function $f(T_1)$ is equal to $m(1-e^{-T_1/n})$ and said function f(C) is equal to $m(1-e^{-C/n})$ where (m) and (n) are approximated to best fit empirical data measured by said third gauge.

16. Apparatus as recited in claim 13 wherein said function $[f(C)-f(T_1)]/D_1$ is equal to a constant (Q) approximated to best fit empirical data measured by said third gauge.

17. Apparatus for controlling the average thickness ($\overline{T}_1$) of a film lamina of thermoplastic material having a known density ($D_1$) and coextruded at a variable extrusion rate with a foam lamina of similar thermoplastic material having a thickness ($T_2$) and a density ($D_2$) to form a thermoplastic laminate, comprising:

a first gauge for sensing the thickness of the laminate which is equal to ($T_1+T_2$) and for providing a caliper signal (C) corresponding to the thickness sensed;

a second gauge for sensing the mass/unit-area of the laminate which is equal to $[(T_1)(D_1)+(T_2)(D_2)]$ and for providing a mass signal (M) corresponding to the mass/unit-area sensed;

a third gauge for sensing a response to said thermoplastic material and its distribution in the laminate and for providing a dielectric signal (W) corresponding to the response which is equal to $(K)[f(T_1)]+(D_2/D_1)[f(C)-f(T_1)]$ where (K) is a ratio of the dielectric effect of the solid material in each lamina, said function $f(T_1)$ is equal to $aT_1/(b+T_1)$ and said function f(C) is equal to $aC/(b+C)$ where (a) and (b) are approximated to best fit empirical data measured by said third gauge; said third gauge being positioned adjacent the film lamina and the sensitivity of said gauge decreasing with the distance therefrom;

a computer having a memory containing the value of the density ($D_1$) of the film lamina, the value of the ratio (K) and the values associated with each of the functions f(C) and $f(T_1)$, said computer being connected to said first, second, and third gauges and being responsive to successive sets of signals comprising the caliper signal (C), the mass signal (M) and the dielectric signal (W) for calculating the thickness ($T_1$) of the film lamina according to the formula:

$$W = (K)[f(T_1)] + \left( \frac{(M - T_1 D_1)}{(C - T_1)} \right) \frac{[f(C) - f(T_1)]}{D_1}$$

combined from the equalitites associated with each signal received, and then for comparing an average thickness ($\overline{T}_1$) of the calculated thicknesses ($T_1$) to a desired thickness ($T_0$) and providing a first control signal (DEC) when the average thickness ($\overline{T}_1$) is less than the desired thickness ($T_0$); and means connected to said computer and responsive to the first control signal (DEC) for decreasing the extrusion rate of the film lamina and responsive to the second control signal (INC) for increasing the extrusion rate of the film lamina.

18. Apparatus for controlling the average thickness ($\overline{T}_1$) of a film lamina of thermoplastic material having a known density ($D_1$) and coextruded at a variable extrusion rate with a foam lamina of similar thermoplastic material having a thickness ($T_2$) and a density ($D_2$) to form a thermoplastic laminate, comprising:

a first gauge for sensing the thickness of the laminate which is equal to ($T_1+T_2$) and for providing a caliper signal (C) corresponding to the thickness sensed;

a second gauge for sensing the mass/unit-area of the laminate which is equal to $[(T_1)(D_1)+(T_2)(D_2)]$ and for providing a mass signal (M) corresponding to the mass/unit-area sensed;

a third gauge for sensing a response to said thermoplastic material and its distribution in the laminate and for providing a dielectric signal (W) corresponding to the response which is equal to $(K)[f(T_1)]+(D_2/D_1)[f(C)-f(T_1)]$ where (K) is a ratio of the dielectric effect of the solid material in each lamina, said function $f(T_1)$ is equal to $m(1-e^{-T_1/n})$ and said function f(C) is equal to $m(1-e^{-C/n})$ where (m) and (n) are approximated to best fit empirical data measured by said third gauge; said third gauge being positioned adjacent the film lamina and the sensitivity of said gauge decreasing with the distance therefrom;

a computer having a memory containing the value of the density ($D_1$) of the film lamina, the value of the ratio (K) and the values associated with each of the functions f(C) and $f(T_1)$, said computer being connected to said first, second, and third gauges and being responsive to successive sets of signals comprising the caliper signal (C), the mass signal (M) and the dielectric signal (W) for calculating the thickness ($T_1$) of the film lamina according to the formula:

$$W = (K)[f(T_1)] + \left( \frac{(M - T_1 D_1)}{(C - T_1)} \right) \frac{[f(C) - f(T_1)]}{D_1}$$

combined from the equalities associated with each signal received, and then for comparing an average thickness ($\overline{T}_1$) of the calculated thicknesses ($T_1$) to a desired thickness ($T_0$) and providing a first control signal (DEC) when the average thickness ($\overline{T}_1$) is greater than the desired thickness ($T_0$) and a second control signal (INC) when the average thickness ($\overline{T}_1$) is less than the desired thickness ($T_0$); and means connected to said computer and responsive to the first control signal (DEC) for decreasing the extrusion rate of the film lamina and responsive to the second control signal (INC) for increasing the extrusion rate of the film lamina.

19. Apparatus for controlling the average thickness $\overline{T}_1$) of a film lamina of thermoplastic material having a known density ($D_1$) and coextruded at a variable extrusion rate with a foam lamina of similar thermoplastic material having a thickness ($T_2$) and a density ($D_2$) to form a thermoplastic laminate, comprising:

a first gauge for sensing the thickness of the laminate which is equal to ($T_1+T_2$) and for providing a caliper signal (C) corresponding to the thickness sensed;

a second gauge for sensing the mass/unit-area of the laminate which is equal to $[(T_1)(D_1)+(T_2)(D_2)]$ and for providing a mass signal (M) corresponding to the mass/unit-area sensed;

a third gauge for sensing a response to said thermoplastic material and its distribution in the laminate and for providing a dielectric signal (W) corresponding to the response which is equal to $(K)[f(T_1)]+(D_2/D_1)[f(C)-f(T_1)]$ where (K) is a ratio of the dielectric effect of the solid material in each lamina and $[f(C)-f(T_1)]/D_1$ is a function equal to a constant (Q) approximated to best fit empirical data measured by said third gauge; said third gauge being positioned adjacent the film lamina and the sensitivity of said gauge decreasing with the distance therefrom;

a computer having a memory containing the value of the density ($D_1$) of the film lamina, the value of the ratio (K), the value of the constant (Q) and the values associated with each of the functions f(C) and $f(T_1)$, said computer being connected to said first, second, and third gauges and being responsive to successive sets of signals comprising the caliper signal (C), the mass signal (M) and the dielectric signal (W) for calculating the thickness ($T_1$) of the film lamina according to the formula:

$$W = (K) [f(T_1)] + \left\{ \frac{(M - T_1 D_1)}{(C - T_1)} \right\} (Q)$$

combined from the equalities associated with each signal received, and then for comparing an average thickness ($\overline{T}_1$) of the calculated thicknesses ($T_1$) to a desired thickness ($T_0$) and providing a first control signal (DEC) when the average thickness ($\overline{T}_1$) is greater than the desired thickness ($T_0$) and a second control signal (INC) when the average thickness ($\overline{T}_1$) is less than the desired thickness ($T_0$); and means connected to said computer and responsive to the first control signal (DEC) for decreasing the extrusion rate of the film lamina and responsive to the second control signal (INC) for increasing the extrusion rate of the film lamina.

* * * * *

UNITED STATES PATENT AND TRADEMARK OFFICE
CERTIFICATE OF CORRECTION

PATENT NO. : 4,514,812
DATED : April 30, 1985
INVENTOR(S) : Peter S. Miller, Maclin S. Hall It is certified that error appears in the above–identified patent and that said Letters Patent are hereby corrected as shown below:

Claim 1, Col. 10, line 23, before "gauge" (two instances) insert --third--.

Signed and Sealed this

Nineteenth Day of November 1985

[SEAL]

Attest:

DONALD J. QUIGG

Attesting Officer

Commissioner of Patents and Trademarks